United States Patent [19]

Stutenkemper et al.

[11] Patent Number: 4,518,138
[45] Date of Patent: May 21, 1985

[54] FASTENING DEVICE

[75] Inventors: Paul Stutenkemper, Pulheim; Heinz Rest, Cologne; Herbert Kloppe, Pulheim, all of Fed. Rep. of Germany

[73] Assignee: Ford Motor Company, Dearborn, Mich.

[21] Appl. No.: 443,705

[22] Filed: Nov. 22, 1982

Related U.S. Application Data

[63] Continuation of Ser. No. 252,109, Apr. 8, 1981, abandoned.

[51] Int. Cl.³ .............................................. F16L 3/08
[52] U.S. Cl. .................................... 248/73; 248/220.2
[58] Field of Search ............. 248/73, 680, 681, 220.2, 248/222.4, 222.2, 74.5; 403/326, 329; 339/277 R, 278 R; 24/16 PB

[56] References Cited

U.S. PATENT DOCUMENTS

| 2,787,693 | 4/1957 | Razlag | 339/278 R |
| 2,968,788 | 1/1961 | Neaderland | 339/277 R |
| 3,617,077 | 11/1971 | Cavanaugh | 403/329 X |

FOREIGN PATENT DOCUMENTS

| 2847505 | 11/1978 | Fed. Rep. of Germany . | |
| 709371 | 1/1966 | Italy | 339/277 R |

Primary Examiner—Ramon S. Britts
Assistant Examiner—Ramon O. Ramirez
Attorney, Agent, or Firm—Daniel M. Stock; Clifford L. Sadler

[57] ABSTRACT

A fastening device for holding leads, wires, carpets, panelling and the like to a structure. The fastening device consists of a holder fixed to the structure with a holding bracket set off from the surface of the structure. A flexible terminal clamp is engageable with the holding bracket.

7 Claims, 9 Drawing Figures

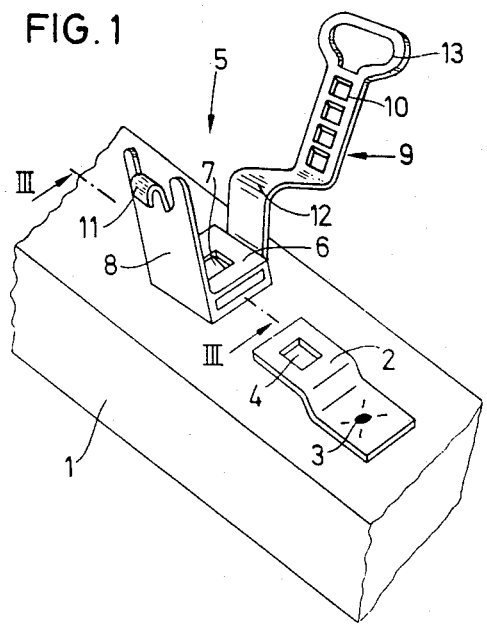
FIG. 1
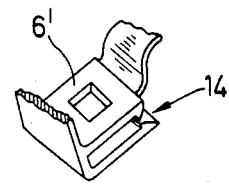
FIG. 2
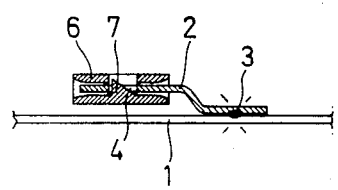
FIG. 3
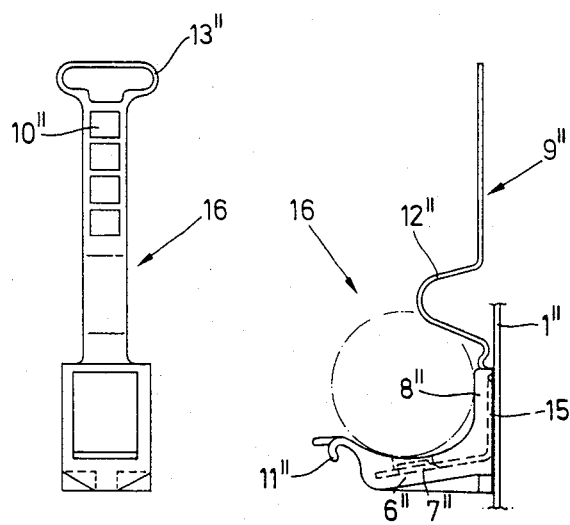
FIG. 4
FIG. 5

FASTENING DEVICE

This is a continuation of application Ser. No. 252,109, filed Apr. 8, 1981, now abandoned.

BACKGROUND OF THE INVENTION

Fastening devices for clamping leads, wires, carpeting, panelling and the like consisting of a holder fixed to structure, the holder having a holding bracket set-off from the surface of the structure with which a flexible terminal clamp can be engaged are already known from German laid-open Pat. No. 1 775 414.

In the case of this known kind of fastening device, the holder fixed to the structure in accordance with one form of construction consists of a T-shaped welded bolt and, in accordance with a second form of construction, of a cap-shaped cover plate. The flexible terminal clamp which can be locked into the holder is shown as a flexible sheet metal clip.

The known fastening device has on the one hand the disadvantage that an expensive special welding device is required for fixing the holder to the structure in the case of a T-shaped welded bolt and in the case of a cap-shaped cover plate two welding points have to be placed by means of a normal portable spot welding gun, and on the other hand that the lead to be held can come into direct contact with the T-shaped welded bolt or the cap-shaped cover plate, respectively, which can cause wear to the lead, especially because of burrs on the cover plate which is made in the form of a sheet metal pressed part.

A fastening device for holding leads which is simpler than the above mentioned fastening device is well known to the applicant through use on car models produced by his employer. In the case of this kind of fastener, a straight clasp is fixed by one end to the vehicle body structure by means of a welding point and the free end of the clasp is bent around the lead to be held. Since the clasp was designed as a simple sheet metal punched part, a plastic sleeve is pushed onto this before the lead was fixed by the bending around of the clasp in order to avoid wear through chafing.

This method of fastening which has been used for a long time had, in addition to the disadvantage that the plastic sleeves occasionally got lost, the additional disadvantage that the clasps bent around the lead sprang slightly back so that with the vibrations which occur in motor vehicles this could lead to annoying rattling noises from the lead.

From an older German patent application No. 28 47 504.0, a fastening device of approximately the type mentioned above was suggested. In the case of this known fastening device, the holder fixed to the structure is designed as a T-shaped welded bolt and receives a shoe-shaped base of a flexible terminal clamp made of plastic. The flexible plastic terminal clasp here has contact surfaces set an an angle to each other and a manually operated strap by means of which the lead can be fixed to the contact surfaces by pretension.

This fastening device reliably avoids rattling noises but makes necessary the use of expensive special welding devices for applying the T-shaped welded bolts. It is therefore the function of the present invention to improve a fastening device of the type mentioned above that with the simplest possible fastening of the holder to the structure a safe method of fixing leads and the like is achieved which is free from chafing wear and rattling noises.

SUMMARY OF THE INVENTION

In accordance with the present invention, the problem of providing a fastening device that is free from chafing wear and rattling noises is solved by a fastening device for holding leads, wiring, carpeting, panelling and the like to a structure that consists of a mount fixed to a structure with a holding bracket set off from the surface of the structure with which a flexible terminal clamp can be engaged. The fastening device is characterised in that the bracket is designed in the form of a Z-shaped or L-shaped bent clasp, one end of which is fixed to the structure. The other free end of the fastening device has an opening, a notch, or the like and is held on the mount by a sleeve-shaped base of a flexible terminal clamp having an internal notch.

By shaping the holder in the form of a Z-shaped or L-shaped bent clasp of which one end is fixed to the structure and the other free end of which has an opening, a notch, or the like and is covered by a sleeve-shaped base of a flexible terminal clamp which has an internal notch, a simple fixing of the clasp to the structure by means of only one welded point applied with a normal portable spot welding gun becomes possible. Yet, direct contact between the lead to be held and the clasp designed as a simple sheet metal pressed part is avoided. Thus, chafing wear to the leads is safely avoided and rattling noises can be avoided by means of elastic clamps or straps on the terminal clamp.

Although it is essential that the sleeve-shaped base covers the clasp, the flexible terminal clamp can be designed for mounting both lengthwise and crosswise to the clasp.

In a particularly advantageous fashion, the contact surfaces for the lead to be held are hereby disposed on the flexible terminal clamp in such a way that one of the contact surfaces is supported directly on the structure and the other contact surface is formed by the sleeve-shaped base which receives the clasps.

DESCRIPTION OF THE DRAWINGS

The invention is explained in greater detail with the aid of two embodiments shown in the accompanying drawings.

FIG. 1 is a oblique sectional view of a fastening device according to the invention immediately before assembly;

FIG. 2 is a further embodiment of the sleeve-shaped base of a flexible terminal clamp according to the invention;

FIG. 3 is a section approximately along the line III—III in FIG. 1 where the fastening device is already assembled;

FIG. 4 is a front view of a further embodiment of a fastening device according to the invention;

FIG. 5 is a side view of the embodiment according to FIG. 4;

DETAILED DESCRIPTION OF THE INVENTION

Figure 6:
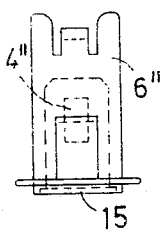
FIG. 6 is a bottom view of the embodiment according to FIG. 5.
Figure 7:
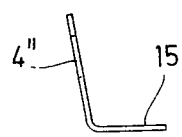
FIG. 7 is a side view of an L-shaped clasp.
Figure 8:
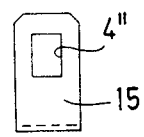
FIG. 8 is a front view of the fixing clasp according to FIG. 7.

In the case of the embodiment of a fastening device shown in FIGS. 1 to 3, a Z-shaped holding clasp 2 is fixed to a component 1 at one of its ends with only one welded point 3 and at its other free end is provided with a square locking aperture 4.

A flexible terminal clamp 5 made of plastic consists essentially of a sleeve-shaped square base 6 with an internal notch 7. Molded onto one side of the base 6 is a contact surface 8 and on the other side a strap 9. The strap 9 has locking apertures 10 which can be locked with a hook 11 to the contact surface 8. The strap 9 can hereby be provided with a clamping curve 12 and a handle 13.

Attention is drawn to the fact that the holders, clamps and straps molded to the base 6 can have various designs and accordingly do not constitute part of this patent application.

The form of construction shown in FIG. 1 of a sleeve-shaped base 6 makes it possible to push on the flexible terminal clamp 5 parallel to the structure 1 lengthwise to the clasp 2.

As can be seen from FIG. 2, a sleeve-shaped base 6' can also have a lateral slot and thus can be pushed parallel to the structure 1, but across the longitudinal direction to the clasp 2.

As can be seen from FIG. 3, the internal notch 7 on the sleeve-shaped base 6 interacts with the locking aperture 4 in the clasp 2 in such a way that unintentional withdrawal of the flexible terminal clamp 5 is prevented. Of course the internal notch 7 must be designed in accordance with the selected direction of assembly for the sleeve-shaped base 6 or 6', respectively.

FIGS. 4 to 8 show a further embodiment of a fastening device whereby for parts which match the first embodiment the same reference symbols are used, but with double priming.

In this embodiment, an L-shaped bent clasp 15 is fixed by one leg by means of one welded point to a structure 1". The L-shaped clasp 15 is provided at its free leg again with a square locking aperture 4".

A flexible terminal clamp 16 again has a sleeve-shaped base 6" with an internal notch 7" by means of which it can be pushed on and locked in the essentially vertical direction to the structure 1" to the L-shaped clasp 15.

In this embodiment, a contact surface 8" is molded onto the side of the sleeve-shaped base 6" adjacent to the structure 1" and a strap 9" is directly connected to it. A hook 11" interacting with locking apertures 10" on the strap 9" is hereby constructed at one end of the sleeve-shaped base 6".

As can be seen particularly from FIG. 5, the flexible terminal clamp is especially suitable for use with vertical surfaces of structures. Here the sleeve-shaped base 6" supported by the free leg of the L-shaped clasp 15 takes on a supporting function so that, for example, a cable in a car can first be placed loosely, then briefly adjusted and only later clamped firmly.

It is also true of this form of construction that the clamps and straps molded on the sleeve-shaped base 6" can be in one of a wide variety of forms.

Figure 9:
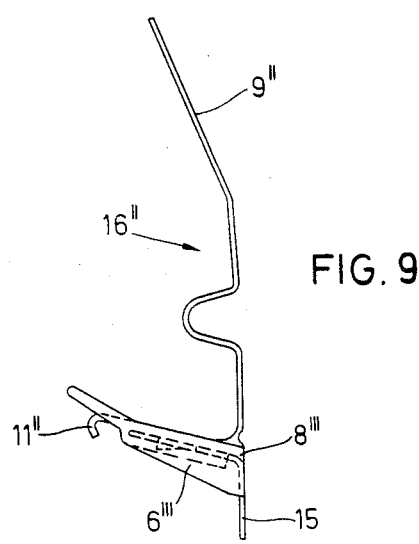
FIG. 9 is a side view of a somewhat modified embodiment based on FIG. 4.

As can be seen from FIG. 9, an embodiment which is slightly modified from that illustrated in FIG. 4 can have a contact surface 8''' and a base 6''', by which the fastening device turned through 180° can be placed on the L-shaped clasp 15. This design is particularly suitable for holding heavy objects.

It is to be understood that this invention is not limited to the exact construction illustrated and described above, but that various changes and modifications may be made without departing from the spirit and scope of the invention as defined in the appended claims.

We claim:

1. Fastening device to hold leads, wires, carpets, panelling and the like to a structure, consisting of a mount fixed to a structure with a holding bracket set off from the surface of the structure, with which a flexible terminal clamp can be engaged, characterized in that the bracket is shaped in the form of a bent clasp having one end welded to the structure and its other end free and set off from the surface of the structure and having an aperture formed through its free end, the flexible clamp includes a sleeve-shaped base portion having an outer surface directly engageable with the leads, wires, carpets, panelling and the like, and surfaces internal thereto for receiving the clasp free end therein, and the base portion includes a latch portion adjacent to but carried entirely internally of the outer engaging surface for lockingly engaging the clasp aperture and the flexible clamp includes a flexible strap portion fixed at one end to the base portion and lockingly engageable at its free end to the base portion to clampingly engage the leads, wires, carpets, panelling and the like directly against the base portion outer surface.

2. Fastening device according to claim 1, characterized in that the bracket is substantially Z-shaped.

3. Fastening device as in claim 2, characterized in that the free end of the Z-shaped bent clasp preferably has a square locking aperture and the sleeve-shaped base of the terminal clamp can be pushed on and locked to the clasp parallel to the surface of the structure in a predetermined direction.

4. Fastening device as in claim 3, characterized in that the sleeve-shaped base of the terminal clamp can be pushed on the clasp in a direction longitudinally of the structure.

5. Fastening device as claim 3, characterized in that the sleeve-shaped base of the terminal clamp can be pushed on the clasp in a direction laterally of the structure.

6. Fastening device as in claim 3, characterized in that the bracket is substantially L-shaped.

7. Fastening device as in claim 6, characterized in that the free end of an L-shaped clasp preferably has a square locking aperture and the sleeve-shaped base of a terminal clamp can be pushed on and locked approximately vertical to the surface of the structure.

* * * * *